United States Patent
Wu

(10) Patent No.: US 11,303,640 B2
(45) Date of Patent: Apr. 12, 2022

(54) CIRCUIT AND PACKET PROCESSING METHOD USED IN NETWORK DEVICE

(71) Applicant: Realtek Semiconductor Corp., HsinChu (TW)

(72) Inventor: Cheng-Yu Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 22 days.

(21) Appl. No.: 17/110,258

(22) Filed: Dec. 2, 2020

(65) Prior Publication Data

US 2022/0014523 A1 Jan. 13, 2022

(30) Foreign Application Priority Data

Jul. 9, 2020 (TW) .................................. 109123187

(51) Int. Cl.
*H04L 9/40* (2022.01)
*H04L 29/06* (2006.01)
*H04L 69/22* (2022.01)
*H04L 49/00* (2022.01)
*H04L 45/745* (2022.01)

(52) U.S. Cl.
CPC .......... *H04L 63/101* (2013.01); *H04L 45/745* (2013.01); *H04L 49/70* (2013.01); *H04L 63/0236* (2013.01); *H04L 63/0485* (2013.01); *H04L 69/22* (2013.01)

(58) Field of Classification Search
CPC ...................................................... H04L 63/101
See application file for complete search history.

(56) References Cited

U.S. PATENT DOCUMENTS

| | | | |
|---|---|---|---|
| 7,283,525 B2 * | 10/2007 | Burgess | H04L 63/0236 370/392 |
| 7,904,642 B1 | 3/2011 | Gupta | |
| 10,089,480 B1 * | 10/2018 | Wang | H04L 63/104 |
| 10,708,272 B1 * | 7/2020 | Holbrook | H04L 9/0643 |
| 2001/0037397 A1 * | 11/2001 | Boucher | H04L 69/162 709/230 |
| 2014/0082122 A1 | 3/2014 | Basso | |
| 2019/0253392 A1 * | 8/2019 | Yagnik | H04L 63/0263 |
| 2022/0014523 A1 * | 1/2022 | Wu | H04L 63/101 |

* cited by examiner

*Primary Examiner* — Ponnoreay Pich
(74) *Attorney, Agent, or Firm* — Winston Hsu

(57) ABSTRACT

A circuit used in a network device, which includes a memory and an analyzer. The memory stores an ACL look-up table, wherein the ACL look-up table includes multiple ACL rules, and each ACL rule contains at least a comparison field, a control field, and a logical operation field. The comparison field includes comparison information of a communication protocol, the control field indicates whether said each ACL rule needs to be combined with a next ACL rule, and the logic operation field indicates a logical operation used when said each ACL rule needs to be combined with the next ACL rule. The analyzer is configured to sequentially compare the packet according to multiple ACL rules recorded in the ACL look-up table, so as to generate at least one comparison result for determining the processing method of the packet.

14 Claims, 3 Drawing Sheets

| Index field | Comparison field | Control field | Logical operation field |
|---|---|---|---|
| 1 | MAC address | 1 | AND |
| 2 | IP address | 1 | AND |
| 3 | TCP port | 0 | |
| 4 | VLAN state | 0 | |
| 5 | Ethernet type | 0 | |
| ⋮ | ⋮ | ⋮ | ⋮ |

| Index field | Comparison field | Control field | Logical operation field |
|---|---|---|---|
| 1 | MAC address | 1 | AND |
| 2 | IP address | 1 | AND |
| 3 | TCP port | 0 | |
| 4 | VLAN state | 0 | |
| 5 | Ethernet type | 0 | |
| ... | ... | ... | ... |

FIG. 2

CIRCUIT AND PACKET PROCESSING METHOD USED IN NETWORK DEVICE

BACKGROUND OF THE INVENTION

1. Field of the Invention

The present invention relates to a network device, and more particularly, to a network switch or a router.

2. Description of the Prior Art

After receiving a packet, a network switch or a router analyzes a header of the packet to obtain information of each field in the header, and then performs operation of table lookup or other processing on the information in the fields. Regarding the table lookup operation, the network switch or the router sets up multiple look-up tables internally, and these multiple look-up tables include access control list (ACL) rules, which are used to find packets with specific media access control (MAC) addresses, packets with specific Internet Protocol (IP) addresses, or packets with specific fields in the headers of other communication protocols, and follow the ACL rule settings for processing.

In addition, since the limitations of hardware such as memory size, the circuit cannot check all fields of the header through the ACL rules. Therefore, the ACL rules are usually classified on the basis of media access control (MAC), internet protocol (IP), transmission control protocol (TCP), user datagram protocol (UDP) or other communication protocols, and the specific fields of these communication protocols are compared against the classified ACL rules.

However, the ACL rules have a limitation, that is, when the circuit wants to compare the fields of the multiple communication protocols at the same time and if there is no ACL rule can include all the field s that need to be searched, the required packet cannot be found. To solve this problem, all packets which meet certain conditions are usually transferred to a processor, and the required packets are found through software. However, this method reduces the overall processing speed, and when the number of packets is large, the burden on the processor is increased.

SUMMARY OF THE INVENTION

Therefore, the present invention provides a method for performing ACL rule analysis on received packets, which adds control fields and logical operation fields to the ACL rules, such that a network switch or a router may perform a combined judgment of comparison results on the ACL rules through hardware, to solve the aforementioned problem.

At least one embodiment of the present invention provides a circuit used in a network device. The circuit includes multiple ports, a memory, a packet buffer and an analyzer. The memory stores an access control list (ACL) look-up table. The ACL look-up table comprises multiple ACL rules. Regarding at least a portion of the multiple ACL rules, each ACL rule comprises at least a comparison field, a control field, and a logical operation field, wherein the comparison field comprises comparison information of a communication protocol, the control field indicates whether said each ACL rule needs to be combined with a next ACL rule, and the logic operation field indicates a logical operation used when said each ACL rule needs to be combined with the next ACL rule. The packet buffer is configured to temporarily store a packet received by one of the multiple ports. The analyzer is configured to sequentially compare the packet against the multiple ACL rules recorded in the ACL look-up table, so as to generate at least one comparison result for determining a processing method of the packet.

At least one embodiment of the present invention provides a packet processing method used in a network device and the packet processing method including: receiving a packet; comparing the packet against multiple ACL rules recorded in a access control list (ACL) look-up table sequentially, to generate at least one comparison result for determining a processing method of the packet. Regarding at least a portion of the multiple ACL rules, each ACL rule comprises at least a comparison field, a control field, and a logical operation field, wherein the comparison field comprises comparison information of a communication protocol, the control field indicates whether said each ACL rule needs to be combined with a next ACL rule, and the logic operation field indicates a logical operation used when said each ACL rule needs to be combined with the next ACL rule.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating an ACL look-up table according to an embodiment of the present invention.

DETAILED DESCRIPTION

Figure 1:
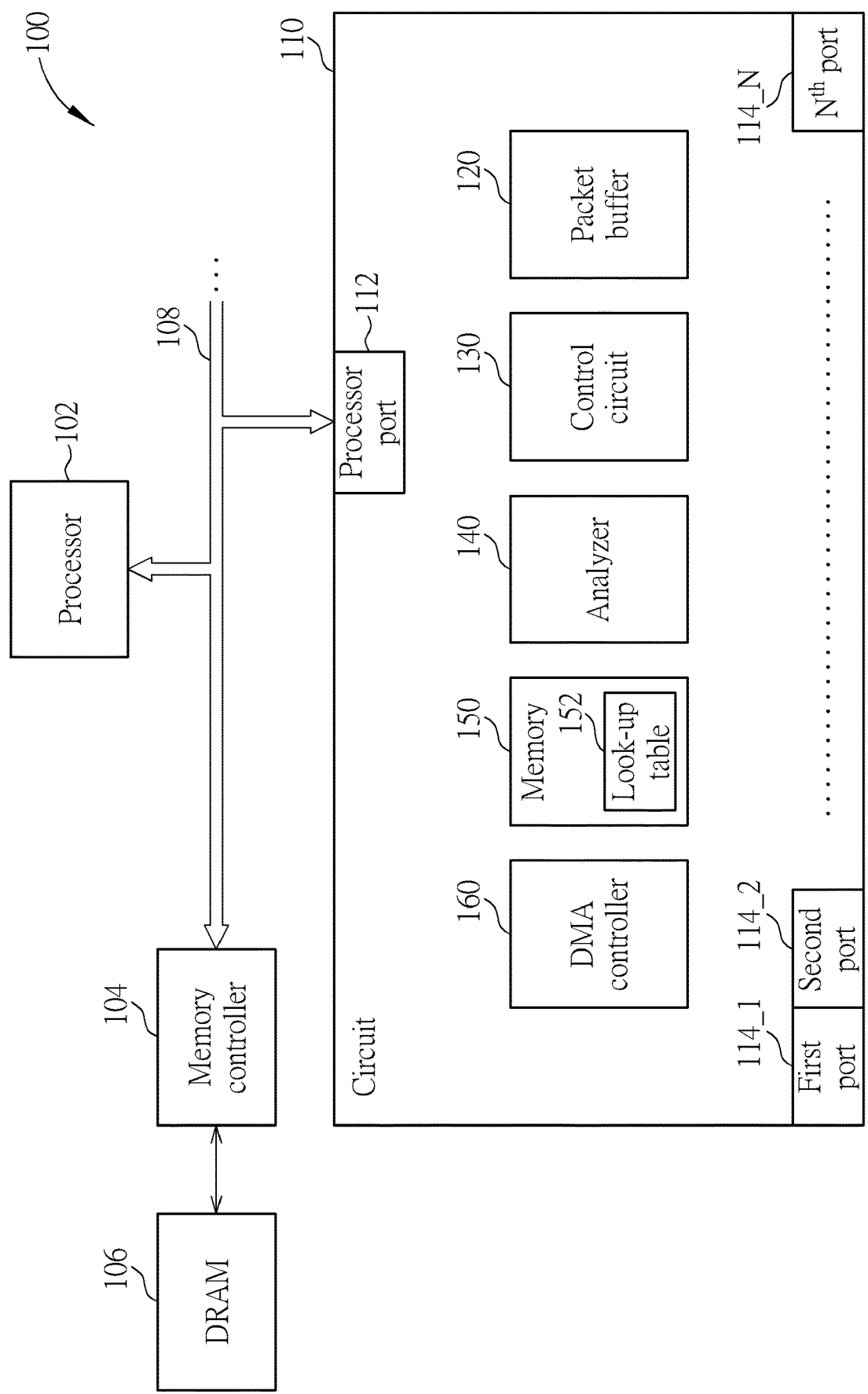
FIG. 1 is a diagram illustrating a network device according to an embodiment of the present invention.

FIG. 1 is a diagram illustrating a network device 100 according to an embodiment of the present invention, wherein the network device 100 can be a network switch or a router. As shown in FIG. 1, the network device 100 includes a processor 102, a memory controller 104 and a dynamic random access memory (DRAM) 106, wherein a circuit 110 includes a processor port 112, a plurality of ports 114_1-114_N, a packet buffer 120, a control circuit 130, an analyzer 140, a memory 150 including at least one look-up table 152, and a direct memory access (DMA) controller 160. It should be noticed that the content of FIG. 1 is only for illustrative purposes, and the network device 100 is not limited as the network switch or the router. In the circuit 110, the processor port 112 is configured to be connected to the processor 102 and the memory controller 104 through at least one bus 108, and the plurality of ports 114_1-114_N are configured to be connected to other electronic devices through a local area network or a wide area network. The packet buffer (or packet register) 120 is configured to temporarily store the packets received from outside and waiting to be forwarded. The memory controller 104 is configured to receive commands from the bus 108 and perform write operation or read operation on the DRAM 106.

In the present embodiment, the look-up table 152 includes an ACL look-up table, and the ACL look-up table includes multiple ACL rules. FIG. 2 is a diagram illustrating an ACL look-up table 200 according to an embodiment of the present invention. As shown in FIG. 2, the ACL look-up table 152 includes multiple ACL rules. Each ACL rule includes at least four fields shown in the figure, such as an index field, a comparison field, a control field and a logical operation field, where the index field is configured to indicate an index value of each ACL rule, and the analyzer 140 performs the analysis according to the order of the index values. The comparison field is configured to indicate information required to be compared, such as a media access control (MAC) address, an internet protocol (IP) address, a transmission control protocol (TCP) port, a user datagram protocol (UDP) port, a virtual local area network (VLAN) state, Ethernet type, etc. included in a header of a received packet. The control field is configured to indicate whether the ACL rule needs to be combined with the next ACL rule. Taking FIG. 2 as an example, the control field of a first ACL rule has the logical value "1". Therefore, a comparison result of the MAC address of the first ACL rule needs to be combined with a comparison result of the IP address in the second ACL rule. In addition, the control field of a fourth ACL rule has the logical value "0". Therefore, a comparison result of the VLAN status of the fourth ACL rule does not need to be combined with a comparison result of the Ethernet type determination of the fifth ACL rule. The logical operation field is configured to indicate which logical operation the combination in the control field belongs to, such as a logical operator "AND" or a logical operator "OR". Taking FIG. 2 as an example for illustration, the logical operation fields of the first ACL rule and the second ACL rule are "AND" operators. Therefore, the comparison result of the MAC address in the first ACL rule, the comparison result of the IP address in the second ACL rule and the comparison result of the TCP port in the third ACL rule need to undergo an "AND" operation, that is, all of the three comparison results need to be "true" at the same time. In addition, the logical operation fields of the third ACL rule and the fourth ACL rule are blank or invalid, meaning that the fourth ACL rule and the fifth ACL rules are judged independently and do not need to be combined with the previous ACL rule.

In the embodiment shown in FIG. 2, the comparison field in each ACL rule only includes the comparison information corresponding to a single communication protocol, but the present invention is not limited thereto.

It should be noticed that the ACL rules in the ACL look-up table 200 shown in FIG. 2 are as an example for illustrative purposes only, and the present invention is not limited thereto. In addition, the ACL look-up table 200 also includes some relevant comparison details of the comparison fields, such as a MAC address range which the MAC address judged by the first ACL rule belongs to or some specific MAC addresses that the MAC address judged by the first ACL rule meets, and further includes the subsequent processing method that is based on the comparison result of the ACL rule (e.g., which port the packet is sent to or dropping/blocking of the packet). Since the present invention focuses on the control field and the logical operation field in the ACL look-up table 200 and the details of the comparison fields and subsequent processing methods are well known to those skilled in the art, this embodiment mainly describes the operations of the control field and the logical operation field.

Figure 3:
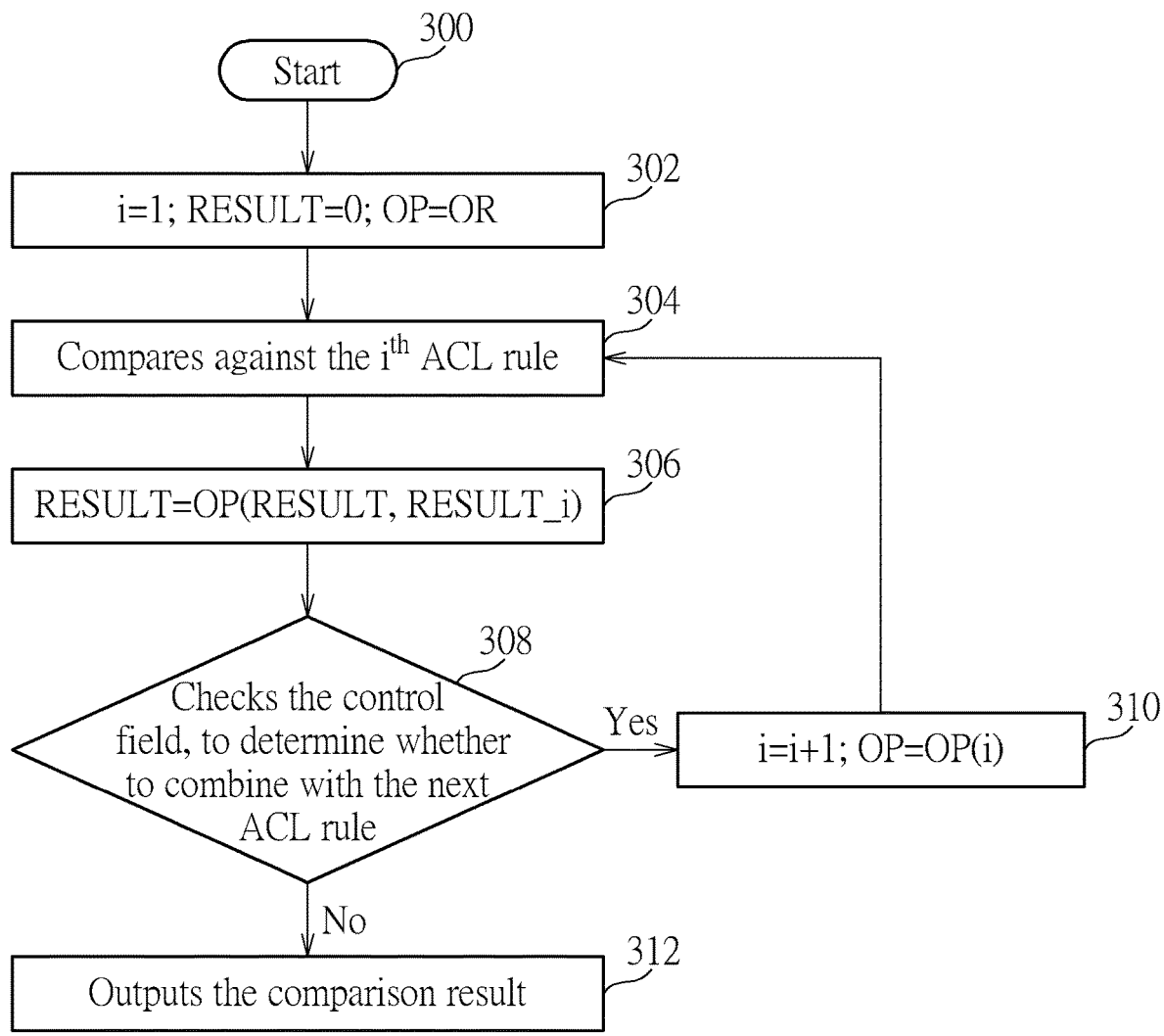
FIG. 3 is a flowchart illustrating a received packet being analyzed according to an embodiment of the present invention.

FIG. 3 is a flowchart illustrating a received packet being analyzed according to an embodiment of the present invention. In step 300, the flow starts. In step 302, the circuit 110 receives a packet through one of the plurality of ports 114_1-114_N, and temporarily stores the packet in the packet buffer 120. The analyzer 140 is ready to use the ACL look-up table 200 to perform an analysis operation on a header of the packet. At this time, the analyzer 140 predetermines several internal parameters as follows: i=1, RESULT=0, and OP=OR, where the parameter i represents the index value of the ACL rule, the parameter RESULT represents the comparison result and the parameter OP represents the logical operation. In step 304, the analyzer 140 selects the $i^{th}$ ACL rule according to the parameter i. Since the current parameter i is "1", the analyzer 140 obtains the MAC address in the header of the packet to compare against the first ACL rule and generates a comparison result RESULT_i. In step 306, the analyzer 140 performs a logical operation on the comparison result RESULT_i and the parameter RESULT (in this case, an "OR" operation is performed), and updates the parameter RESULT according to the operation result. In step 308, the analyzer 140 checks the control field of the $i^{th}$ ACL rule to determine whether to combine with the $(i+1)^{th}$ ACL rule. If Yes, the flow proceeds with Step 310. If No, the flow proceeds with Step 312. In step 310, the analyzer 140 sets the parameters as follows: i=(i+1), and OP=OP (i), where OP (i) represents to the logical operation specified in the logical operation field of the $i^{th}$ ACL rule, that is, taking the first ACL rule as an example to illustrate, OP(i) is the "AND" operation. Then the flow proceeds with Step 302 to continue to compare against the next ACL rule.

When the flow proceeds with Step 302 to compare against the second ACL rule (step 302 to step 306), the analyzer 140 loads the IP address recorded in the header of the packet from the packet buffer 120, and analyzes the IP address of the packet to generate the comparison result RESULT_i (i.e., RESULT_2). The analyzer 140 performs the logical operation ("AND" operation) on the comparison result RESULT_2 and the parameter RESULT, and updates the parameter RESULT according to an operation result. Then, through step 308 and step 310, the flow proceeds with Step 302 again to compare against the third ACL rule. In the process of comparing against the third ACL rule (step 302 to step 306), the analyzer 140 loads the TCP port recorded in the header the packet from the packet buffer 120, and analyzes the TCP port of the packet to generate a comparison result RESULT_i (i.e., RESULT_3). The analyzer 140 performs a logical operation ("AND" operation) on the comparison result RESULT_3 and the parameter RESULT, and updates the parameter RESULT according to the operation result. Then, the flow proceeds with Step 312 again through step 308.

In step 312, the analyzer 140 uses the current parameter RESULT as a final comparison result, and the analyzer 140 or the control circuit 130 determines the processing method of the packet according to the final comparison result. For example, the packet is sent via one of the ports 114_1-114_N to other network devices, the packet is dropped, or the packet is sent to the DRAM 106 for allowing the processor 102 to further determine the processing method of the packet through software.

In addition, taking the ACL rule shown in FIG. 2 as an example, after the analyzer 140 has processed the third ACL rule, the analyzer 140 outputs the parameter RESULT as the final comparison result. At this time, the parameter RESULT is the result of performing an "AND" operation on comparison results of the first, second and third ACL rules. Furthermore, after the analyzer 140 has processed the third ACL rule, the analyzer 140 further compares against the fourth ACL rule. At this time, the flow proceeds with Step 302 again, and the parameters are reset as follows: I=4, RESULT=0, and OP=OR.

In the above embodiment, by additionally setting the ACL rule in the ACL look-up table 200 with the control field and the logical operation field, hardware (such as the analyzer 140) may directly compare fields in the packet header that correspond to different communication protocols, to appropriately process the packet. In addition, the analyzer 140 and the control circuit 130 may determine the subsequent processing of the packet. Therefore, a probability that the packet needs to be sent to the DRAM 106 and then judged by software running on the processor 102 can be greatly reduced, so as to facilitate the overall packet processing speed and to reduce burden of the processor 102.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit used in a network device, comprising:
   multiple ports;
   a memory, storing an access control list (ACL) look-up table, wherein the ACL look-up table comprises multiple ACL rules, regarding at least a portion of the multiple ACL rules, each ACL rule comprises at least a comparison field, a control field, and a logical operation field, the comparison field comprises comparison information of a communication protocol, the control field indicates whether said each ACL rule needs to be combined with a next ACL rule, and the logic operation field indicates a logical operation used when said each ACL rule needs to be combined with the next ACL rule;
   a packet buffer, configured to temporarily store a packet received by one of the multiple ports; and
   an analyzer, configured to sequentially compare the packet against the multiple ACL rules recorded in the ACL look-up table, so as to generate at least one comparison result for determining a processing method of the packet.

2. The circuit of claim 1, wherein comparison fields of the multiple ACL rules comprise comparison items of multiple different communication protocols.

3. The circuit of claim 2, wherein the comparison fields of the multiple ACL rules comprise at least one of a media access control (MAC) address, an internet protocol (IP) address, a transmission control protocol (TCP) port and a user datagram protocol (UDP) port.

4. The circuit of claim 2, wherein the comparison field of said each ACL rule of said at least a portion of the multiple ACL rules comprises the comparison information corresponding to a single communication protocol only.

5. The circuit of claim 1, wherein the analyzer starts from a first ACL rule of the multiple ACL rules to sequentially compare the packet with the multiple ACL rules, and does not generate said at least one comparison result until a specific ACL rule is compared, where the comparison field of the specific ACL rule indicates that the specific ACL rule is not required to be combined with the next ACL rule.

6. The circuit of claim 5, wherein an operation of generating said at least one comparison result is only performed by the analyzer, and is not assisted or performed by software running on a processor.

7. The circuit of claim 1, wherein the network device is a network switch or a router.

8. A packet processing method used in a network device, comprising:
   receiving a packet;
   comparing the packet against multiple ACL rules recorded in a access control list (ACL) look-up table sequentially, to generate at least one comparison result for determining a processing method of the packet;
   wherein regarding at least a portion of the multiple ACL rules, each ACL rule comprises at least a comparison field, a control field, and a logical operation field, the comparison field comprises comparison information of a communication protocol, the control field indicates whether said each ACL rule needs to be combined with a next ACL rule, and the logic operation field indicates a logical operation used when said each ACL rule needs to be combined with the next ACL rule.

9. The packet processing method of claim 8, wherein comparison fields of the multiple ACL rules comprise comparison items of multiple different communication protocols.

10. The packet processing method of claim 9, wherein the comparison field of said each ACL rule of said at least a portion of the multiple ACL rules only comprises the comparison information corresponding to a single communication protocol only.

11. The packet processing method of claim 9, wherein the comparison fields of the multiple ACL rules comprise at least one of a media access control (MAC) address, an internet protocol (IP) address, a transmission control protocol (TCP) port and a user datagram protocol (UDP) port.

12. The packet processing method of claim 8, wherein comparing the packet against the multiple ACL rules recorded in the ACL look-up table sequentially, to generate said at least one comparison result for determining the processing method of the packet comprises:
   starting from a first ACL rule of the multiple ACL rules to sequentially compare the packet with the multiple ACL rules; and
   not generating said at least one comparison result until a specific ACL rule is compared, where the comparison field of the specific ACL rule indicates that the specific ACL rule is not required to be combined with the next ACL rule.

13. The packet processing method of claim 12, wherein the network device comprises an analyzer, an operation of generating said at least one comparison result is only performed by the analyzer, and is not assisted or performed by software running on a processor.

14. The packet processing method of claim 8, wherein the network device is a network switch or a router.

* * * * *